US010097628B2

(12) United States Patent
Xu et al.

(10) Patent No.: US 10,097,628 B2
(45) Date of Patent: Oct. 9, 2018

(54) RESOURCE AFFINITY IN A DYNAMIC RESOURCE POOL

(71) Applicant: Microsoft Corporation, Redmond, WA (US)

(72) Inventors: Qi Xu, Kirkland, WA (US); Neil L. Shipp, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 991 days.

(21) Appl. No.: 14/167,283

(22) Filed: Jan. 29, 2014

(65) Prior Publication Data
US 2015/0215229 A1 Jul. 30, 2015

(51) Int. Cl.
G06F 15/173 (2006.01)
H04L 29/08 (2006.01)
G06F 17/30 (2006.01)

(52) U.S. Cl.
CPC .......... *H04L 67/1027* (2013.01); *G06F 17/30* (2013.01); *H04L 67/1031* (2013.01)

(58) Field of Classification Search
CPC ................ H04L 67/1027; H04L 67/1031
USPC ........................................................ 709/226
See application file for complete search history.

(56) References Cited

U.S. PATENT DOCUMENTS

| 6,173,313 | B1 * | 1/2001 | Klots | G06F 9/465 |
| | | | | 707/999.1 |
| 6,195,703 | B1 * | 2/2001 | Blumenau | G06F 9/505 |
| | | | | 709/211 |
| 6,807,619 | B1 * | 10/2004 | Ezra | G06F 12/084 |
| | | | | 711/130 |
| 6,850,927 | B1 * | 2/2005 | Hsu | G06F 17/30463 |
| | | | | 707/999.002 |
| 7,069,321 | B1 * | 6/2006 | Curtis | G06F 17/30289 |
| | | | | 707/E17.032 |
| 7,366,755 | B1 * | 4/2008 | Cuomo | H04L 12/66 |
| | | | | 370/230 |
| 7,490,164 | B2 * | 2/2009 | Srivastava | H04L 45/50 |
| | | | | 370/235 |
| 8,429,162 | B1 * | 4/2013 | Wang | G06F 17/30584 |
| | | | | 707/737 |

(Continued)

FOREIGN PATENT DOCUMENTS

KR 20090012523 A 2/2009

OTHER PUBLICATIONS

Roth, Gregor, "Server Load Balancing Architectures, Part 2: Application-Level Load Balancing", Published on: Oct. 21, 2008, Available at: http://www.javaworld.com/javaworld/jw-10-2008/jw-10-load-balancing-2.html.

(Continued)

*Primary Examiner* — Krista M Zele
*Assistant Examiner* — Timothy J Sowa
(74) *Attorney, Agent, or Firm* — Talem IP Law, LLP

(57) ABSTRACT

Techniques disclosed herein describe methods for achieving resource affinity and scalability in dynamic environments by calculating the modulus of a numeric request identifier against a fixed selection of numbers. Using the proposed techniques yields a numeric request identifier and resource identifier combination that ensures a given resource possesses the unique state applicable to that user's request. Using a fixed selection of numbers thus maintains resource affinity while achieving scalability as resources are added to or subtracted from a pool of resources.

20 Claims, 10 Drawing Sheets

(56) References Cited

U.S. PATENT DOCUMENTS

| | | | | |
|---|---|---|---|---|
| 8,438,574 B1* | 5/2013 | Lyle | G06F 9/50 | 718/100 |
| 8,762,534 B1* | 6/2014 | Hong | G06F 9/505 | 370/389 |
| 9,232,001 B1* | 1/2016 | Mixter | G06F 11/1433 | 709/226 |
| 2003/0037093 A1* | 2/2003 | Bhat | G06F 9/505 | 718/105 |
| 2004/0185931 A1* | 9/2004 | Lowell | G07F 17/329 | 463/17 |
| 2005/0022047 A1* | 1/2005 | Chandrasekaran | G06F 17/30362 | 714/5.11 |
| 2006/0195576 A1* | 8/2006 | Rinne | H04L 12/5695 | 709/226 |
| 2006/0277180 A1* | 12/2006 | Okamoto | G06F 17/30566 | 707/999.007 |
| 2007/0115982 A1* | 5/2007 | Pope | H04L 45/742 | 370/392 |
| 2008/0019351 A1* | 1/2008 | Piper | G06F 9/5033 | 370/352 |
| 2010/0179984 A1* | 7/2010 | Sebastian | H04L 12/1859 | 709/203 |
| 2010/0281031 A1* | 11/2010 | Voice | G06F 17/30545 | 707/741 |
| 2011/0029319 A1* | 2/2011 | Mills | G06F 17/30539 | 705/2 |
| 2011/0131336 A1* | 6/2011 | Wang | H04L 67/104 | 709/228 |
| 2012/0197956 A1* | 8/2012 | Fischer | G06F 7/722 | 708/530 |
| 2013/0212704 A1* | 8/2013 | Shablygin | G06F 21/6218 | 726/28 |
| 2013/0282510 A1* | 10/2013 | Swamy | G06Q 30/02 | 705/26.4 |
| 2014/0189792 A1* | 7/2014 | Lesavich | G06F 17/30864 | 726/3 |

OTHER PUBLICATIONS

Nair, Ratish, "Load Balancing Exchange Server 2013—Good to Know Stuff", Published on: Jun. 5, 2013 Available at: http://msexchangeguru.com/2013/06/05/load-balancing/.

* cited by examiner

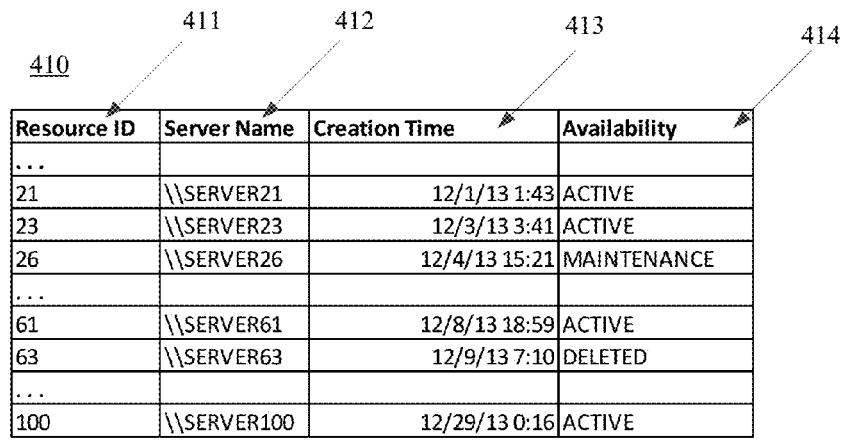

| Resource ID | Server Name | Creation Time | Availability |
|---|---|---|---|
| ... | | | |
| 21 | \\SERVER21 | 12/1/13 1:43 | ACTIVE |
| 23 | \\SERVER23 | 12/3/13 3:41 | ACTIVE |
| 26 | \\SERVER26 | 12/4/13 15:21 | MAINTENANCE |
| ... | | | |
| 61 | \\SERVER61 | 12/8/13 18:59 | ACTIVE |
| 63 | \\SERVER63 | 12/9/13 7:10 | DELETED |
| ... | | | |
| 100 | \\SERVER100 | 12/29/13 0:16 | ACTIVE |

FIG. 4C

```
FUNCTION GetResourcefromNRI( integer NRI) as Integer
    ValidResourceID = FALSE
    NumberPosition = 1
    WHILE Not ValidResourceID
        ResourceID = NRI mod PredefinedListArray[NumberPosition]
        IF ValidResource(ResourceID) = TRUE THEN
            ValidResourceID = TRUE
        ELSE
            NumberPosition = NumberPosition + 1
        ENDIF
    ENDWHILE
    RETURN ResourceID
END FUNCTION
```

FIG. 5

RESOURCE AFFINITY IN A DYNAMIC RESOURCE POOL

BACKGROUND

Distributed and cloud computing environments use shared resources to facilitate enterprise and personal productivity. Application services, such as for email, information management, productivity, social network, security, domain control, and database management, may be run in such distributed and/or cloud computing environments. The shared resources may include pools of interchangeable resources on which content may be stored and accessed via an intermediate layer and/or application programming interface (API). Clients communicating with an application service may include an identifier that can be used to determine the resource(s) to which the client request should be directed. Some types of applications maintain contextual information about the request on the resource, requiring that subsequent requests be directed back to the same resource after an initial request. These types of applications are sometimes called "stateful," or it is said that they require "resource affinity."

Some methods of returning a subsequent request to the same resource have focused on using centralized lists or databases that map subsequent requests to the resource possessing the relevant "state." In environments with large resource pools, the resource with the centralized list then may become a bottleneck. Other methods that eschew centralized lists have been challenged by the difficulty of maintaining resource affinity in environments where resources are frequently being added or removed from the available resource pool. The methods these systems use often involve reshuffling the state residing on resources each time the number of resources changes, which itself can cause excessive processing load and application client delays.

BRIEF SUMMARY

Techniques are disclosed for efficiently maintaining resource affinity and scalability in dynamic resource environments.

Given a client request, an associated resource can consistently be found—as long as the resource is available—to serve the request in a dynamic environment by calculating the modulus of a resource identifier generated using a request identifier provided with, or generated from, the client request against at least one of a sequence of a fixed selection of numbers. The result of the modulus calculation indicates the associated resource that can serve the client request. If a first of the sequence of numbers returns an identifier of a resource that is not available (or does not exist), then a next of the sequence of numbers is used in the calculation until an available resource is returned.

In some cases more than one resource may be requested and in other cases a single resource may be requested. In some scenarios where a single resource is requested, more than one associated resource may be calculated and indicated for serving the request. The fixed selection of numbers maintains resource affinity while achieving scalability as resources are added to or subtracted from a pool of resources since, regardless of the number of available resources, the calculation will indicate the same associated resource (if it is available). If an indicated resource is not available a next likely resource can be calculated (or accessed when more than one associated resource is calculated and indicted for serving the request).

In some implementations, a predefined list is provided with the middleware (or middle layer) that stores the sequence of a fixed selection of numbers. The predefined list may be a fixed selection of prime numbers. The predefined list may include at least one number that is higher than the number of available resources in the dynamic resource pool.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 4C depicts an example data structure for tracking the availability of resources that may be used in the method illustrated in FIG. 4B.

FIG. 5 depicts example pseudocode which may be useful in implementing some embodiments.

DETAILED DESCRIPTION

Techniques are disclosed for efficiently maintaining resource affinity and scalability in dynamic resource environments.

The techniques described herein are suitable for software or firmware applications that make use of distributed resources. Suitable software or firmware applications include, but are not limited to, an application locally installed on a client machine accessing remote data stores, an application run on a remote cloud server and rendered locally through a web browser interface, or any intermediate architecture in which at least some external resources are required.

A "resource" in this context refers to a data store, a server running software capable of handling a type of processing request, or other kinds of destinations or pathways for application requests. Non-limiting examples include a cache server containing cached information, a user's email storage container on a remote email server, and even an entire server machine capable of processing a complex task.

Figure 1:
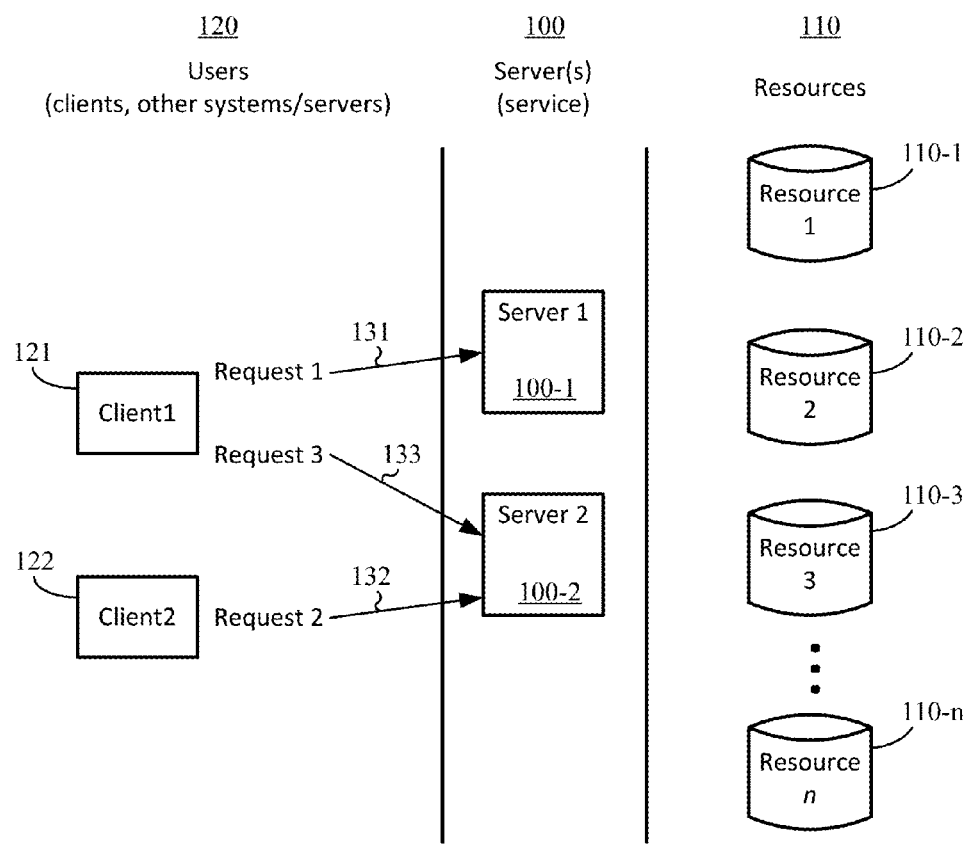
FIG. 1 illustrates an environment in which the techniques described herein may be practiced.

FIG. 1 illustrates an environment in which the techniques described herein may be practiced. In an online datacenter environment or other distributed cache system, one or more servers or services 100 (e.g., Server1 100-1 and Server2 100-2) may provide an intermediate layer connecting to a plurality of resources 110 (e.g., 110-1, 110-2, 110-3, ..., 110-n).

In one implementation, the resources 110 may be domain controllers, such as available to access a mailbox through an Exchange® server (or servers). In another implementation, such as in a distributed cache system, each resource (110-1, ..., 110-n) may act as a cache server and can have its own content. In yet another implementation, the server or services 100 and resources 110 may be implemented as part of a system on a chip or in a system with a plurality of processors (virtual and/or physical) taking advantage of thread affinity for thread scheduling.

The resources 110 may be taken on and off-line (e.g., for repair or routine maintenance) and even modified to include additional resources from a same or different location. In some cases, the resources 110 may be located individually or in clusters at different geographical locations from each other and even from the servers 100 handling the requests to a particular resource (or resources). A group of functionally interchangeable resources is sometimes known as a "server farm," "resource cluster," or "resource pool."

Users 120 of the system, which may include clients and other systems or servers, access content on the resources 110 through an intermediate layer server or service 100. From a user perspective, the particular resource being accessed is not necessarily known. Indeed, in many cases, the ultimate location of the content being accessed (and the steps involved to access the content) is transparent to the user.

In environments where a large numbers of users 120 (perhaps millions of users per second in a web-based application) simultaneously request resources 110, a method of distributing those requests to a smaller number of resources (than the number of users) can be utilized. This method often involves hashing.

"Hashing" refers to a technique used in software engineering to distribute or sort a large number of one type of entity into a smaller group of containers or buckets. The distribution assignment may be randomly determined, or determined according to a defined characteristic of the entity. Therefore, hashing may be used as a technique to distribute millions of user requests to networked servers efficiently and evenly to a few hundred functionally identical resources capable of fulfilling the request. However, some applications make requests that utilize resources in such a way as to require the context of a previous request to be valid.

A first client 121 may make a first request 131 of the system, for example to Server1 100-1. Server1 determines an appropriate resource (or resources) to serve the request and communicates with the resources 110. A second client 122 may make a second request 132 or the first client 121 may make a third request 133 for the same content (and machine) to which the first request 131 was served. However, because of the structure of the intermediate layer, these requests may end up directed to Server2 100-2, for example, when multiple servers are involved in supporting a service. Therefore, it is not always sufficient to store information at a particular server of the intermediate layer.

Consider an example environment in which an email application has a server infrastructure built to support a large number of users. The company running the application may have installed dozens of identical servers running the same software to handle the large user base. While these servers may be functionally equivalent, they may not all contain exactly the same data at the same time. For example, when a user signs up to be a new user of the email system, the software may call an application function to "Create New Mailbox." The initial server that receives the "new mailbox" request creates a new data store on the server to manage the user's mail. Over time, the new data store may be replicated to multiple servers so that redundancy and load balancing is achieved. However, such replication across hundreds of resources may be very slow. Therefore, as one example, if the user begins to change the names of folders immediately after creating the new mailbox, the subsequent requests may fail unless they are executed on the same server as initially created the mailbox.

Applications that function in the manner described are sometimes called "stateful," or are said to have "state" or have "resource affinity." Examples of real-life applications that utilize hashing include large email environments running Microsoft Exchange® Server mail software, Facebook®, Twitter®, and Google Gmail®.

Applications that require resource affinity can be difficult to scale by the addition of new resources to the resource cluster. Optimally, new resources should be able to be added with no impact on the existing functioning of the application environment. One way of maintaining resource affinity across calls is to use a centralized data store of all requests and their resource affinities. However, this method has the disadvantage of itself being difficult to scale, since once the number of requests grows extremely large, the centralized data store itself may become the bottleneck to resource allocation.

One way of hashing requests to resources while maintaining a modicum of affinity is to use a modulus function. A modulus function divides a first number x (typically an integer) by a second number n (typically an integer) and returns the remainder as an integer between zero and n−1. For example, "5 mod 2" results in an answer of "1" because two divides into five two times with one left over. Since the modulus of any starting number x is between zero and n−1, a modulus function can be used to "hash" an integer of any size into a much smaller number of "buckets." Practically every computer language has a modulus function, including C, C++, Java®, JavaScript®, Visual Basic®, Perl®, and PHP and any of these (or other languages) may be used in various implementations.

A successful hashing using the modulus function and effectively maintaining resource affinity can occur when the dividend x is a numeric value, preferably (but not required to be) an integer, and uniquely identifies the user request within a given processing context. Given the same dividend x for each request, using a constant divisor n will yield the same modulus. Thus, resource affinity is maintained.

One possible way of utilizing a modulus function to hash requests to a predefined resource is to compute the modulus of a request identifier over (against) the number of resources in the resource cluster. This mechanism achieves adequate load balancing, but does not achieve scalability because adding or removing resources from the cluster will modify the modulus calculation for every request identifier, breaking resource affinity.

Techniques disclosed herein describe methods for achieving resource affinity and scalability in dynamic environments by calculating the modulus against a fixed selection of numbers. The numbers may be predefined during the systems engineering phase of a dynamic resource environment and thus do not change when resources are added or subtracted from the cluster. This feature maintains server affinity while achieving scalability. Using the proposed techniques to compute the modulus function on the request identifier yields a request identifier and resource identifier combination that makes it more likely a given resource possesses the unique state applicable to that user's request.

Figure 2:
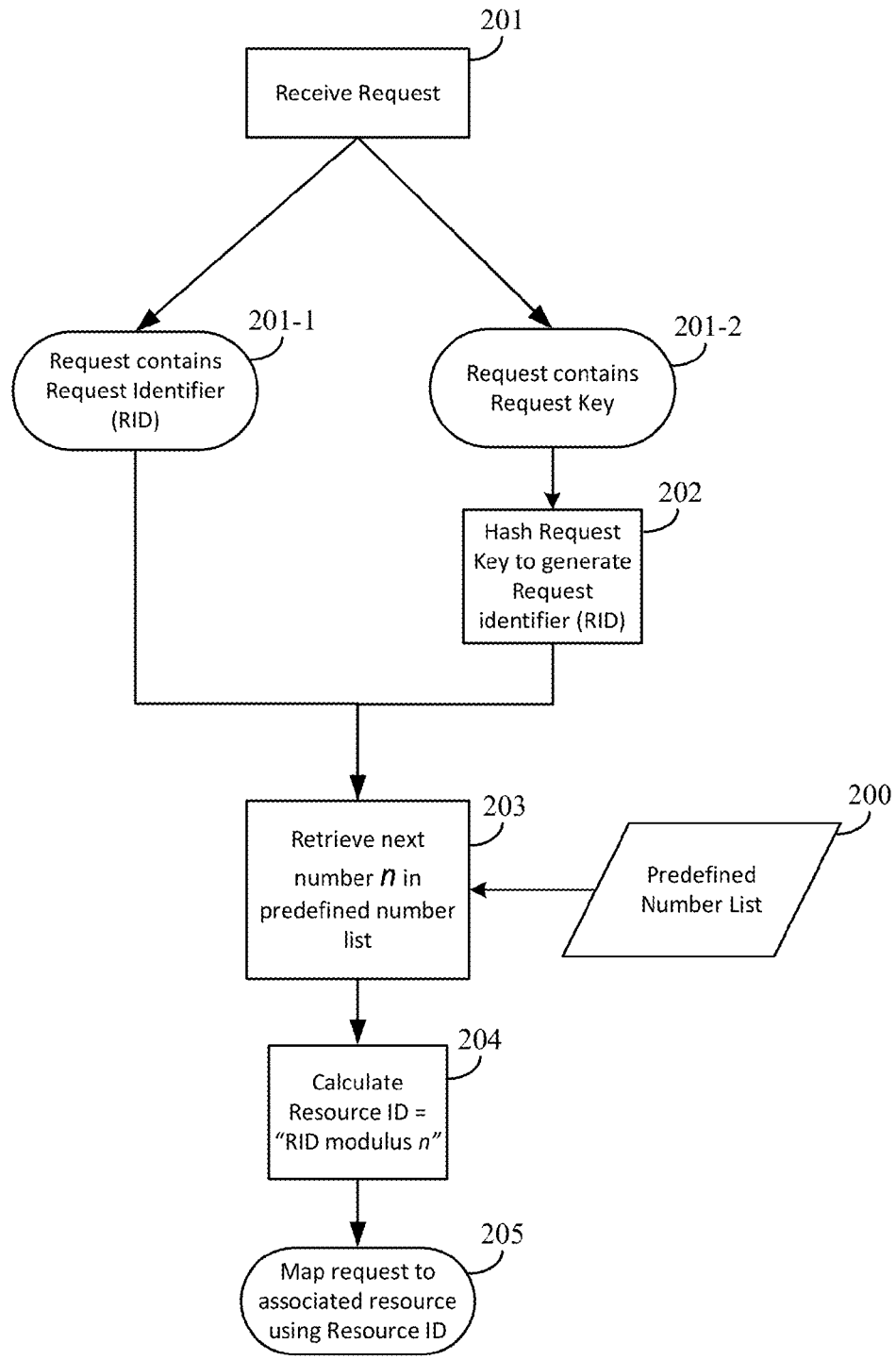
FIG. 2 illustrates an example process flow for generating a resource identifier from a request.

FIG. 2 illustrates an example process flow for generating a resource identifier from a request. As described in various embodiments herein, a predefined number list 200 can be used to obtain resource identifiers while achieving scalability and resource affinity.

The predefined list of numbers 200 can be generated as a result of systems engineering and systems definition separate from any adjustment to the addition and subtraction of resources during system operations. The predefined list of numbers may be implemented in a multitude of ways. In one implementation, the predefined list of numbers contains a set of numbers in descending order of magnitude. According to many implementations, the list is traversed sequentially. However, the list need not be traversed sequentially. For example, any pattern in which the order of traversal is repeatable may be used. In addition, the predefined list need not be an ordered list, in that the numbers need not be ordered by magnitude even when the list is traversed sequentially. For example, the predefined number list might contain 123, 37, and 83, in that order. In addition, while sequential traversal is a simple and effective approach for retrieving a next number n of the predefined number list 200, other approaches may be used.

In certain embodiments, the largest number in the predefined list is selected to be equal to or greater than the expected number of resources in the dynamic resource pool. In certain embodiments, the predefined list is a set of prime numbers. In one implementation, the predefined list contains prime numbers beginning with at least one with a magnitude larger than the expected maximum number of resources in the dynamic resource pool and the next several smaller prime numbers. It should be understood that the highest magnitude number in the list may be smaller than the number of resources in the dynamic resource pool at a particular time; however, in that case, not all resources may actually be taken advantage of.

Referring to FIG. 2, the process flow may begin upon receipt of a request (201) containing a request identifier (RID) 201-1 or request key 201-2.

The RID 201-1 can be included as part of the context for a request to a resource or server. For example, in many applications, an initial connection with the resource cluster is established by the use of login credentials. After authorizing the user's credentials, a unique numeric session or request identifier (the RID) may be generated by the system and returned to the application to be used as a context for subsequent requests.

In some cases, the request may contain a request key 201-2 rather than a specific request identifier. In an email system, for example, email address and password (login credentials) might be sent as part of the initial connection parameters. The email address and password themselves form part of a "request key" that uniquely identifies the request for the processing context. The user login information thus may be converted to a request identifier using established methods of converting variable-length character strings into unique numeric forms, for example, by using the cryptographic hash functions available in MD5 or various types of SHA (202).

According to certain implementations, for clients that support sending the RID as part of the request, the request may contain the RID and the RID may be processed directly in operation 203. For clients that send a Request Key, a hashing function may be performed (202) for converting the request key into a RID.

Once the RID is obtained, the next number (n) in the predefined number list 200 can be retrieved (203). The resource identifier is then calculated in the manner "(request identifier) mod n" (204). The request may be then be mapped to the associated resource using the computed resource identifier (205).

Figure 4A:
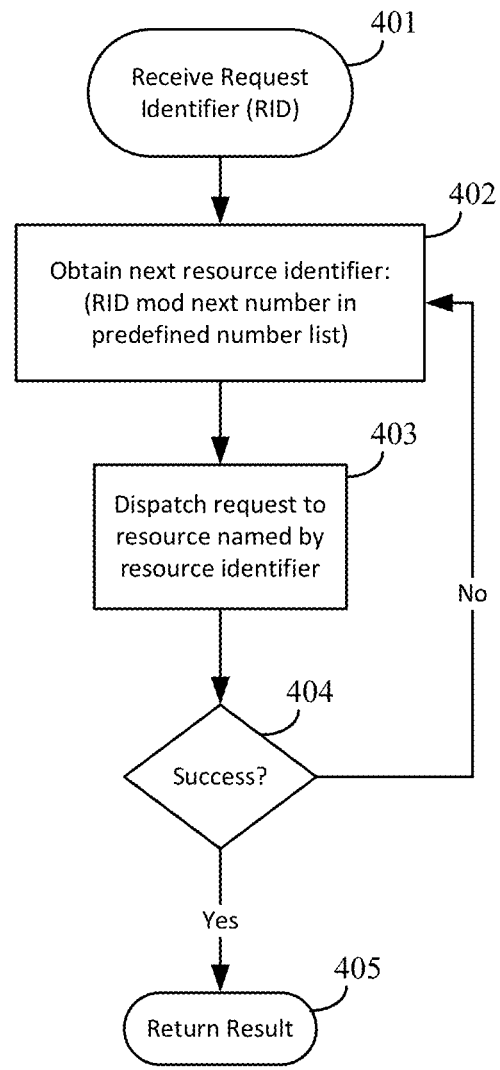
FIGS. 4A and 4B illustrate process flows where a request may be mapped to its associated resources.
Figure 4B:
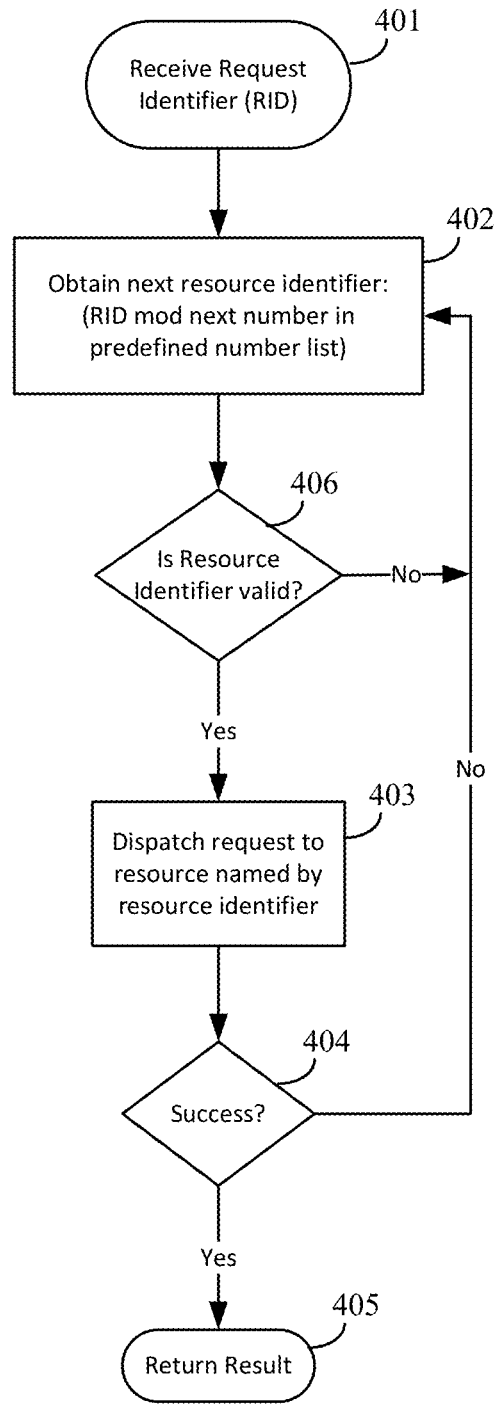

The operation of retrieving the next number n in predefined number list (203) may be called multiple times in a given implementation in order to determine one or more valid resource identifiers (see operations 204 and 205). The next number n may be sequential or based on some other pattern so long as the system can keep track of the current number position in the predefined number list for a given numeric request identifier. FIGS. 4A and 4B illustrate example implementations in more detail. In addition, pseudocode is provided in FIG. 5 as another example illustration. Certain implementations of the process flow illustrated in FIG. 2 (and FIGS. 4A, 4B, and 5) may be carried out at the server(s) 100 described with respect to FIG. 1.

Figure 3:
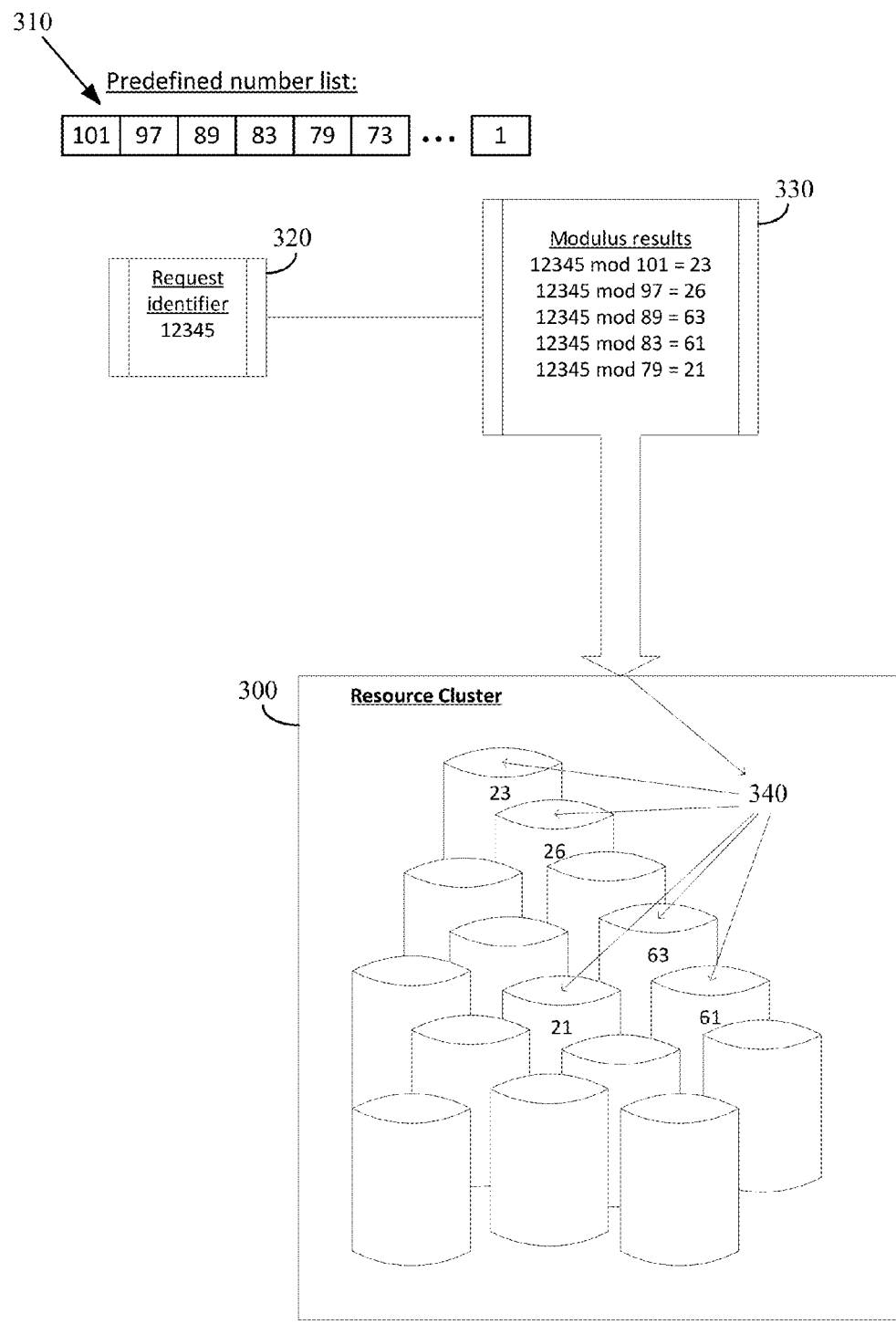
FIG. 3 depicts a representation of an example process flow where a modulus function and prime numbers in a predefined number list are used to identify specific resources from a resource cluster.

FIG. 3 depicts a representation of an example process flow where a modulus function and prime numbers in a predefined number list are used to identify specific resources from a resource cluster. The embodiment illustrated in FIG. 3 shows how a predefined list of prime numbers (also referred to as "primes") may be used to hash a given numeric request identifier into several resource buckets, each given a numeric identifier. The example scenario shown in FIG. 3 involves a resource cluster 300 with an expected maximum number of resources of one hundred separate but functionally equivalent resources (for clarity, all resources not shown).

A predefined number list 310 is populated with a number around the magnitude of 100 (the expected maximum number of resources of the resource cluster 300). Selecting a number equal to or greater than the expected maximum number of resources can facilitate access to all resources. Since the example utilizes a prime number list, 101 was selected as a highest magnitude number for the list along with the other prime numbers in descending order down to 1. It should be understood that the illustrated predefined number list 310 is just an example and a list having prime numbers do not require all prime numbers to be present (nor are all numbers required to be primes or in a particular order of magnitude).

When a request is received, the request identifier can be obtained (320). For example, a numeric request identifier of the integer 12345 may be obtained. The modulo operation of the numeric request identifier (e.g., "12345") against the first number (and possibly several numbers) in the number list 310 (as 12345 mod n) can be calculated (330). In this example, the resulting resource identifiers from the modulus calculations are 23, 26, 63, 61, and 21. The calculated resource identifiers may be used to specifically direct requests or other communications (340) to the appropriate resource(s) (23, 26, 63, 61, and 21). In some cases, multiple calculations may be performed for a single request before communicating with the corresponding resources. In some cases, a next calculation is performed when a previous calculated resource identifier does not result in an available resource.

Predefined number list 200, 310 may be implemented as a simple text file read by the processing function at run time or at service startup, as a database table, or even as a hard-coded array within a programming language's data structures. The predefined list may also be calculated dynamically based on a "Maximum Resources" setting defined by the systems engineering personnel when the application utilizing the proposed techniques is first installed, or later after the number of resources is modified. In the case of the embodiment utilizing prime numbers, for example, the predefined number list may be populated by selecting the first prime number that exceeds the "maximum resources" parameter and the next several smaller prime numbers. The primes may be programmatically generated or selected from pre-calculated list of primes.

FIGS. 4A and 4B illustrate process flows where a request may be mapped to its associated resources. FIG. 4C depicts an example data structure for tracking the availability of resources that may be used in the method illustrated in FIG. 4B.

Referring to FIG. 4A, once a request identifier (RID) is received (401), the resource identifier can be determined using a predetermined number list and a modulus calculation. The RID may be obtained directly from a request or obtained through a hash or other mapping function. The resource identifier can be obtained by calculating the modulus on the request identifier (as the dividend) using a "next" available number in the predefined list of numbers (as the divisor) (402). Although referred to as a "next" available number, the first number in the predefined list is used for each first iteration attempt. The list may be traversed from the beginning each time a request identifier is received.

Once the resource identifier is generated, the request can be dispatched to the resource denoted by the resource identifier (403). If the call is successful (404) (meaning that the resource is available and capable of satisfying the original request), then the result is returned (405); otherwise, (if the resource is unavailable) the operation 402 is repeated using the next number in the predefined number list. In some implementations, multiple resource identifiers may be generated concurrently by using a first k numbers of the pre-defined number list to perform the calculations in operation 402. These concurrently generated resource identifiers can be used to issue communications to multiple resources concurrently. Then, the one that returns a successful call can be used. For example, three concurrent calculations may be carried out on the first three numbers of the predefined number list and communications can be dispatched to all three results.

The example process flow depicted in FIG. 4B is similar to that shown in FIG. 4A, but an additional step involving maintaining a list of available resources is included. For example, once a request identifier (RID) is received (401), a corresponding resource identifier can be obtained by calculating "RID mod n," where n is a next number in predetermined number list (402). Once the resource identifier is generated, but before dispatching the request to the resource (403), the implementation illustrated in FIG. 4B includes a look-up of a table or list entry indicating available resources, for example as illustrated in FIG. 4C.

Referring to FIG. 4C, a list or table 410 may be maintained in a database or other storage associated with the system or server(s) carrying out the processes described in FIG. 4B. The list/table 410 can be maintained to indicate the available resources (processing servers in the example), mapping the resources 411 to their network names 412 and tracking the creation time 413 and availability 414 of each resource. A variety of status flags (e.g., 'active,' 'deleted,' 'maintenance') may be used to track availability 414, as shown. In some cases, the list can include a time stamp 413, which may be used to retire a status flag after a period of time or to indicate when to refresh the information.

In one implementation, when a resource is deleted or briefly brought offline for maintenance, the corresponding table entry may be marked by the system administrator using an administration application. Alternatively, or additionally, a separate process may "ping" each server or perform a "heartbeat" function (another type of request that can be used to monitor a computer/communication channel similar to a ping request) periodically to automatically track the availability of servers. The pinging and updating of tables may be carried out using any suitable technique known in the art.

Returning to FIG. 4B, once the resource identifier is obtained (402), the resource identifier is checked against the list/table to determine whether the resource identifier is valid (406). If the table indicates that the resource identifier corresponds to a resource that is not available, then the processing step 402 is repeated using the next number in the predefined number list. If the table indicates that the resource identifier corresponds to a resource that is available, the request can be dispatched to the resource denoted by the resource identifier (403). If the call is successful (404) (meaning that the resource is available and capable of satisfying the original request), then the result is returned (405); otherwise, (if the resource is unavailable) the processing step 402 is repeated using the next number in the predefined number list.

The inclusion of the list or table of resources may reduce the processing overhead incurred by multiple calls to offline or inoperable resources.

FIG. 5 depicts example pseudocode which may be useful in implementing some embodiments. Such a function may be callable locally or remotely as an API function. Referring to FIG. 5, a function, labeled "Get Resourcefrom NRIO" takes an integer numeric request identifier ("NRI"). As mentioned above, the integer numeric request identifier may be contained in the request or obtained upon applying a hash function to a request key contained in the request. Variables indicating whether a resource identifier refers to a valid resource ("ValidResourceID") and indicating a number position along the predetermined list of numbers ("NumberPosition") may be initiated. Then, until a valid resource is obtained, a modulus calculation is performed to generate a corresponding resource identifier by taking the numeric request identifier mod the number at the number position along the predetermined list of numbers ("PredefinedListArray[NumberPosition]"). For example, if the corresponding resource identifier is available, then that resource identifier is returned; otherwise, the number at the next number position along the predetermined list of numbers is used in the modulus calculation.

Figure 6:
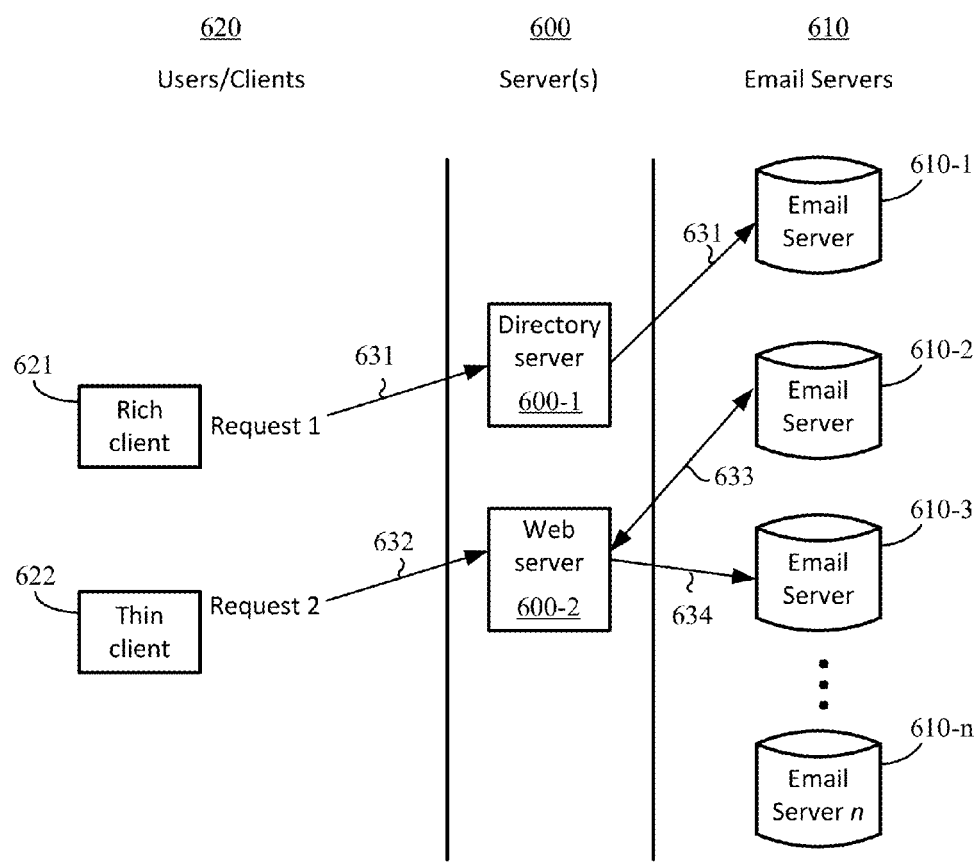
FIG. 6 depicts an example scenario in which the techniques described herein are implemented in an email server environment.

FIG. 6 depicts an example scenario in which the techniques described herein are implemented in an email server environment. As previously mentioned, a large email system may contain dozens or hundreds of email servers that users (via various application clients) access to send and retrieve email and perform other functions. In some circumstances, critical information necessary for client functioning may be stored on one email server, but not on another in the resource group.

Referring to FIG. 6, an email server environment may involve one or more servers 600, for example, a directory server 600-1 and/or a web server 600-2. The one or more servers may be used as an intermediate layer for accessing the email servers 610, which provide a dynamic resource pool for the email server environment.

Users 620 may access email services using various types of client applications. Client applications may be "rich," meaning that they have a full range of functions and perform more processes locally, or "thin," meaning that they use cloud services for most processing and merely display or render the results. Rich clients may be part of desktop operating systems like Microsoft Windows®, or part of mobile operating systems like Android® OS or Apple® iOS™. Thin clients include applications hosted inside a browser such as Google Chrome™. An example of a rich email client is Microsoft Outlook®, and an example of a thin/web client is one that accesses Google Gmail® or Microsoft Office® Web Application webmail service through a browser application such as Microsoft® Internet Explorer or Google Chrome™.

Requests from clients may be directed to the appropriate email servers 610 through the intermediate servers 600, which may perform processes facilitating resource affinity in the email server environment.

For example, rich client 621 may issue a request 631 that is directed to server tier 600 and processed by directory server 600-1. The directory server 600-1 may, for example, validate the user's login credentials and then direct the rich client's request to that user's home email server 610-1 by taking the modulus of the user's request identifier over a number from a predetermined number list. The client's request can be consistently directed to email server 610-1 regardless of the changes in the numbers of emails servers that are online. If email server 610-1 has been taken offline for maintenance, a next likely email server handling the client's home information may be obtained, for example, by taking the modulus of the user's request identifier over a next number from the predetermined number list.

For example, another client, such as thin client 622, in which a user accesses her mail account through a web browser, may issue a request 632 that is directed to server tier 600 and processed by web server 600-2 to initially indicate email server 610-2 as the associated resource. The request identifier may be obtained by performing a hash function of a request key provided with the request 632; and the resource identifier for web server 600-2 may be obtained by performing a modulus calculation using the request identifier and a first number of a predetermined number list. However, as illustrated, a communication 633 between the web server 600-2 and the initially mapped email server 610-2 can indicate that email server 610-2 is offline (for example due to maintenance).

Since email server 610-2 has been taken offline, a next likely email server handling the client's home information may be obtained, for example, by taking the modulus of the user's request identifier over a next number from the predetermined number list. In this case, the next available email server (based on the mapped resource identifier) that indicated as being online is email server 610-3. Thus, the web server 600-2 can direct the thin client's request 632 to the email server 610-3 as communication 634.

Figure 7A:
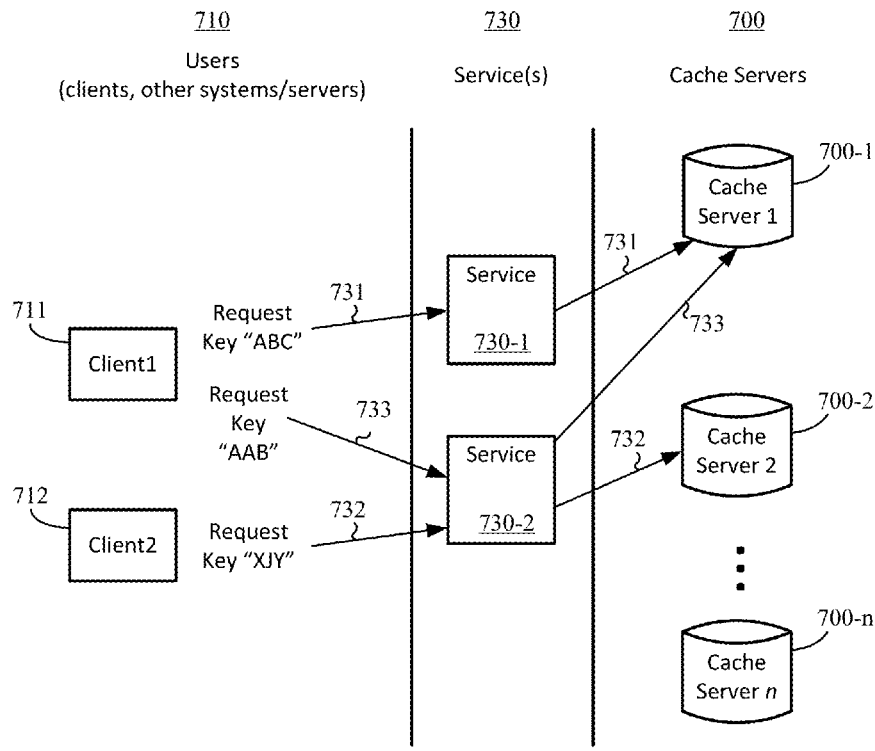
FIG. 7A depicts an example scenario in which the techniques described herein are implemented in a distributed cache server environment.
Figure 7B:
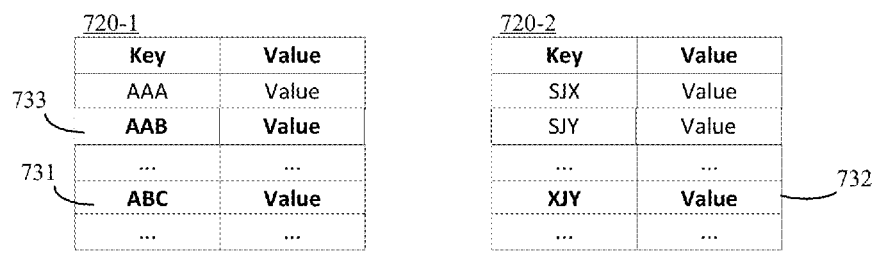
FIG. 7B illustrates key value pairs for the scenario described with respect to FIG. 6A.

FIG. 7A depicts an example scenario in which the techniques described herein are implemented in a distributed cache server environment; and FIG. 7B illustrates key value pairs for the scenario described with respect to FIG. 7A. A distributed cache environment is one where data is not stored on an individual server's memory, but on other cloud resources, and the cached data is made available to an application (regardless of the web server or virtual machine on which it runs). Servers may be removed or added (for scaling or maintenance) while the cached data continues to be accessible to the application.

A distributed cache system may store, for example, key-value pairs that are used to store and retrieve data in cache. Values or other cached entities can be indexed by key value. Large numbers of key-value pairs may be distributed across multiple cache servers for load balancing purposes.

Implementations enable a dynamic pool or cluster 700 of cache servers (700-1, . . . , 700-n) by using a predefined number list instead of a single number in a modulus operation on a request identifier to produce a resource identifier. In FIG. 7A, client applications, users, or other systems or servers 710 (e.g., client1 711 and client2 712) may request the value indexed by a particular key. As shown in FIG. 7B, the key and value pairs may, for example, be stored as lookup tables (720-1 and 720-2) across cache servers (e.g., 700-1, 700-2) in a cache server resource cluster 700.

First client 711 may make request 731 to retrieve the indexed value from cache servers 700. The request is first delegated to service layer 730 which may contain one or more components or services implementing the proposed techniques to map the request to the appropriate cache server in resource cluster 700. The request may be processed by any of the services 700-1 or 700-2 (if more than one) in service layer 700.

Each request key can be mapped by the service layer 730 to the appropriate server using a process such as described with respect to FIG. 4A or 4B so that the value may be returned to the requesting client. For example, in the case of request 731, cache server 700-1 may contain the requested value indexed by the request key "ABC." In the case of request 732, cache server 700-2 may contain the requested value indexed by the request key "XJY." In the case of request 733, cache server 700-1 may contain the requested value indexed by the request key "AAB." Because of the predefined number list, as the cache servers are taken offline or additional cache servers are added, it is not necessary to update the divisor number of the modulus function with an exact number of available resources in order to maintain resource affinity.

Figure 8:
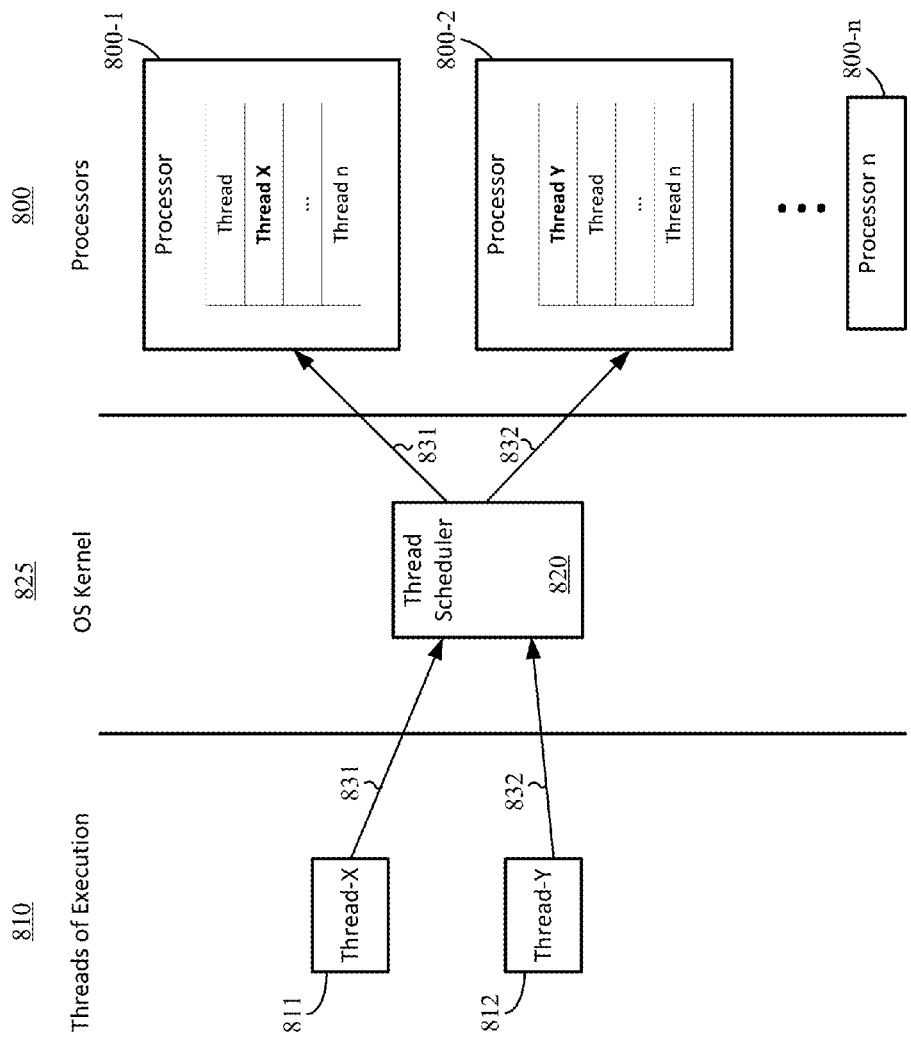
FIG. 8 depicts an example scenario in which the techniques described herein are implemented to assist in maintaining processor affinity during thread scheduling.

FIG. 8 depicts an example scenario in which the techniques described herein are implemented to assist in maintaining processor affinity during thread scheduling. As illustrated in FIG. 8, the techniques described herein may be incorporated as part of a system on a chip or in a system with a plurality of processors (virtual and/or physical) taking advantage of thread affinity for thread scheduling.

A processor executes the instructions of one or more application programs interacting with the device operating system. In multithreaded and/or multiprocessor 800 systems, processing instructions are executed on one or more threads of execution 810. The amount of time each thread (e.g., thread-x 811 and thread-y 812) receives to run its instructions on a processor is assigned by a thread scheduler 820, usually resident in the kernel 825 of the operating system.

The initial assignment of a thread for code execution 810 may occur randomly or via some algorithm within the scheduler 820. In many cases, after the initial assignment of a thread and the beginning of processing, data structures or other context within the thread may be repeatedly operated upon by subsequent instructions. Hence, some operations utilize memory structures, or "state" stored in specific registers in a particular thread, in order to run efficiently or properly. Processors tend to work most efficiently when they do not have to shift these structures unnecessarily, as when a thread is moved across processors.

Examples of processors 800 include general purpose central processing units, application specific processors, and logic devices, as well as any other type of processing device, combinations, or variations thereof. Device operating systems generally control and coordinate the functions of the various components in a computing device or system, providing an easier way for applications to connect with lower level interfaces like the networking interface. Non-limiting examples of operating systems include Windows® from Microsoft® Corp., IOS™ from Apple, Inc., Android® OS from Google, Inc., Windows® RT from Microsoft®, and the Ubuntu® variety of the Linux® OS from Canonical®. A thread scheduler 820 incorporating techniques as described herein may be provided for any available operating system.

The techniques described herein may be used to efficiently achieve thread affinity to a thread's home processor by implementation in a thread scheduler 820. For example, threads of execution 810 can be scheduled by kernel 825 having thread scheduler 820. Thread scheduler 820 may access a predefined number list and perform modulus calculations to delegate requests to the appropriate processor in a pool of physical or virtual processors 800.

In FIG. 8, thread-x 811 makes a request for execution 831 to thread scheduler 820, which then routes the request to processor 800-1 possessing appropriate register state for thread-x. Similarly, thread-y makes a request for execution 832 to thread scheduler 820, which then routes the request to processor 800-2 possessing appropriate register state for thread-y. Thus, expensive processor register shifting may be avoided.

Figure 9:
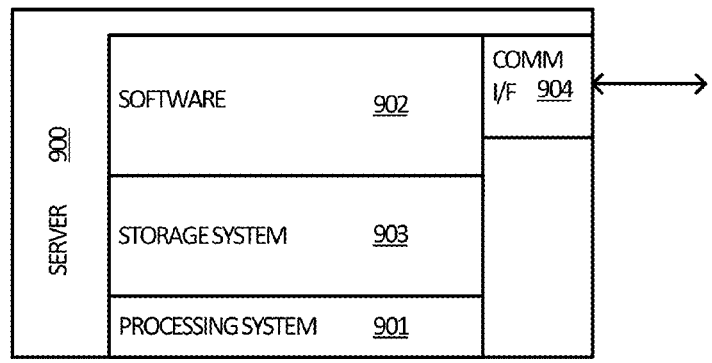
FIG. 9 shows a block diagram illustrating components of a computing device or system used in some embodiments.

FIG. 9 shows a block diagram illustrating components of a computing device or system used in some embodiments. For example, server(s) 200 may be implemented as server 900, which can include one or more computing devices. The server 900 can include one or more blade server devices, standalone server devices, personal computers, routers, hubs, switches, bridges, firewall devices, intrusion detection devices, mainframe computers, network-attached storage devices, and other types of computing devices. The server hardware can be configured according to any suitable computer architectures such as a Symmetric Multi-Processing (SMP) architecture or a Non-Uniform Memory Access (NUMA) architecture.

The server 900 can include a processing system 901, which may include a processing device such as a central processing unit (CPU) or microprocessor and other circuitry that retrieves and executes software 902 from storage system 903. Processing system 901 may be implemented within a single processing device but may also be distributed across multiple processing devices or sub-systems that cooperate in executing program instructions.

Examples of processing system 901 include general purpose central processing units, application specific processors, and logic devices, as well as any other type of processing device, combinations, or variations thereof. The one or more processing devices may include multiprocessors or multi-core processors and may operate according to one or more suitable instruction sets including, but not limited to, a Reduced Instruction Set Computing (RISC) instruction set, a Complex Instruction Set Computing (CISC) instruction set, or a combination thereof. In certain embodiments, one or more digital signal processors (DSPs) may be included as part of the computer hardware of the system in place of or in addition to a general purpose CPU.

Storage system 903 may comprise any computer readable storage media readable by processing system 901 and capable of storing software 902. Storage system 903 may include volatile and nonvolatile, removable and non-removable media implemented in any method or technology for storage of information, such as computer readable instructions, data structures, program modules, or other data.

Examples of storage media include random access memory, read only memory, magnetic disks, optical disks, CDs, DVDs, flash memory, magnetic cassettes, magnetic tape, magnetic disk storage or other magnetic storage devices, or any other suitable storage media. Certain implementations may involve either or both virtual memory and non-virtual memory. In no case does storage media consist of a propagated signal. In addition to storage media, in some implementations storage system 903 may also include communication media over which software 902 may be communicated internally or externally.

Storage system 903 may be implemented as a single storage device but may also be implemented across multiple storage devices or sub-systems co-located or distributed relative to each other. Storage system 903 may include additional elements, such as a controller, capable of communicating with processing system 901.

Software 902 may be implemented in program instructions and among other functions may, when executed by server 900 in general or processing system 901 in particular, direct server 900 or processing system 901 to operate as described herein for facilitating resource affinity in a dynamic resource pool. Software 902 may include additional processes, programs, or components, such as operating system software or other application software. Software 902 may also include firmware or some other form of machine-readable processing instructions executable by processing system 901.

In general, software 902 may, when loaded into processing system 901 and executed, transform server 900 overall from a general-purpose computing system into a special-purpose computing system customized to facilitate resource affinity in a dynamic resource pool as described herein for each implementation. Indeed, encoding software 902 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary storage.

Server 900 may represent any computing system on which software 902 may be staged and from where software 902 may be distributed, transported, downloaded, or otherwise provided to yet another computing system for deployment and execution, or yet additional distribution.

It should be noted that many elements of server 900 may be included in a system-on-a-chip (SoC) device. These elements may include, but are not limited to, the processing system 901, a communications interface 904, and even elements of the storage system 903 and software 902.

In embodiments where the server 900 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A communication interface 904 may be included, providing communication connections and devices that allow for communication between server 900 and other computing systems (not shown) over a communication network or collection of networks (not shown) or the air. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

Figure 10:
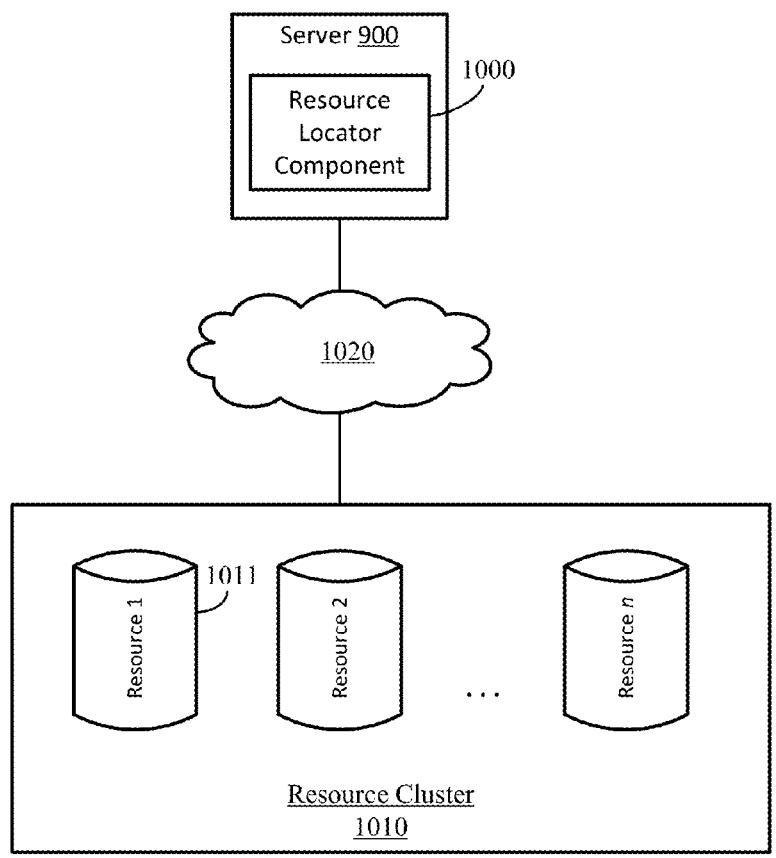
FIG. 10 illustrates an example system architecture in which an implementation of a technique for facilitating resource affinity may be carried out.

FIG. 10 illustrates an example system architecture in which an implementation of a technique for facilitating resource affinity may be carried out. In the example illustrated in FIG. 10, a resource locator component 1000 can be implemented on a server, such as server 900 as described with respect to FIG. 9. The resource locator component may be implemented as software or hardware (or a combination thereof) on the server 900. The resource locator component 1000 can determine appropriate resources to which requests are to be directed and can communicate the requests to the appropriate resources of remote resources in a resource cluster 1010 available over network 1020.

The network 1020 can include, but is not limited to, a cellular network (e.g., wireless phone), a point-to-point dial up connection, a satellite network, the Internet, a local area network (LAN), a wide area network (WAN), a WiFi network, an ad hoc network, an intranet, an extranet, or a combination thereof. The network may include one or more connected networks (e.g., a multi-network environment) including public networks, such as the Internet, and/or private networks such as a secure enterprise private network.

The number of resources in the resource cluster 1010 may vary, but the resource locator component can maintain resource affinity through using a predefined number list. Resource locator component 1000 can generate a resource identifier matching to a valid resource (for example, 1011) by calculating a modulus function of a numeric request identifier over a number from the predefined number list (and a next number in the list if the result of the modulus function does not obtain a valid or online resource).

Resource locator component 1000 may be implemented as a programming function which may be accessible or "callable" through an API. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

The API is generally a set of programming instructions and standards for enabling two or more applications to communicate with each other and is commonly implemented over the Internet as a set of Hypertext Transfer Protocol (HTTP) request messages and a specified format or structure for response messages according to a REST (Representational state transfer) or SOAP (Simple Object Access Protocol) architecture.

An API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic.

The API-calling component may be a local component (i.e., on the same data processing system as the API-implementing component) or a remote component (i.e., on a different data processing system from the API-implementing component) that communicates with the API-implementing component through the API over a network.

It should be understood that an API-implementing component may also act as an API-calling component (i.e., it may make API calls to an API exposed by a different API-implementing component) and an API-calling component may also act as an API-implementing component by implementing an API that is exposed to a different API-calling component. The API and related components may be stored in one or more machine-readable storage media (e.g., storage media such as hard drives, magnetic disks, solid state drives, random access memory, flash, CDs, DVDs and the like).

It should be understood that the examples and embodiments described herein are for illustrative purposes only and that various modifications or changes in light thereof will be suggested to persons skilled in the art and are to be included within the spirit and purview of this application.

What is claimed is:

1. A method of facilitating resource affinity in a dynamic resource pool, the method comprising:
    receiving a request for access to content, the content being stored in a distributed or cloud computing environment on an associated server resource of a changing group of server resources, the changing of the changing group of server resources occurring through adding or removing one or more server resources to or from the changing group;
    mapping the request to the associated server resource, wherein the mapping comprises:
        calculating a modulus on a request identifier with at least a first number in a predefined list of numbers to generate a resource identifier identifying the associated server resource, wherein each modulus result is a resource identifier that identifies possible server resources in the changing group, wherein at least one of the possible server resources is possible to be the associated server resource; and
    communicating with the associated server resource corresponding to the resource identifier.

2. The method of claim 1, further comprising performing a hash function of a request key to generate the request identifier.

3. The method of claim 2, wherein the wherein the request key comprises a string.

4. The method of claim 1, wherein the largest number in the predefined list is selected to be equal to or greater than an expected maximum number of server resources in the changing group of server resources.

5. The method of claim 1, wherein when calculating the modulus of the request identifier with at least the first number in the predefined list of numbers, the predefined list of numbers is traversed sequentially until a resource identifier to a valid available associated server resource is achieved.

6. The method of claim 5, wherein a next number in the predefined list is not used until a current number does not return the resource identifier to the valid available associated server resource.

7. The method of claim 1, further comprising maintaining a resource list; and determining a status of a particular server resource of the changing group of server resources by reviewing the resource list based on the resource identifier before communicating with the associated server resource.

8. The method of claim 1, further comprising: communicating with the associated server resource identified by the resource identifier to determine its availability; and
   in response to receiving a status of available, communicating the request to the associated server resource;
   in response to receiving a status of not available, communicating with a next associated server resource identified by another resource identifier generated by calculating the modulus on the request identifier with a next number in the predefined list of numbers.

9. An apparatus comprising:
   one or more computer readable storage media;
   a predefined list of numbers stored on at least one of the one or more computer readable storage media; and
   program instructions stored on at least one of the one or more computer readable media that, when executed by a processing system, direct the processing system to:
      receive a request for access to content, the content being stored in a distributed or cloud computing environment on an associated server resource of a changing group of server resources, the changing of the changing group of server resources occurring through adding or removing one or more server resources to or from the changing group;
      map the request to the associated server resource, the map comprising:
         calculating a modulus on a request identifier with at least a first number in the predefined list of numbers to generate a resource identifier identifying the associated server resource, wherein each modulus result is a resource identifier that identifies possible server resources in the changing group, wherein at least one of the possible server resources is possible to be the associated server resource; and
         communicating with the associated server resource corresponding to the resource identifier.

10. The apparatus of claim 9, further comprising instructions stored on at least one of the one or more computer readable media that, when executed by the processing system, direct the processing system to:
   in response to receiving a request, perform a hash function of a request key of the request to generate the request identifier.

11. The apparatus of claim 9, wherein the predefined list of numbers consists of prime numbers.

12. The apparatus of claim 9, wherein the predefined list of numbers is arranged with numbers in descending order.

13. The apparatus of claim 9, wherein the largest number in the predefined list is equal to or greater than an expected maximum number of server resources of the changing group of server resources.

14. The apparatus of claim 9, further comprising:
   a resource list stored on at least one of the one or more computer readable storage media, the resource list indicating a status of server resources of the changing group of server resources according to the resource identifier; and
   instructions stored on at least one of the one or more computer readable storage media that, when executed by the processing system, direct the processing system to:
      maintain the resource list; and
      determine a status of the associated server resource identified by the resource identifier before communicating with the associated server resource.

15. The apparatus of claim 9, further comprising:
   instructions stored on at least one of the one or more computer readable storage media that, when executed by the processing system, direct the processing system to:
      communicate with the associated server resource identified by the resource identifier to determine its availability; and
      in response to receiving a status of available, communicate the request to the associated server resource;
      in response to receiving a status of not available, calculate the modulus on the request identifier with at least a next number in the predefined list of numbers.

16. A resource locator comprising:
   one or more computer readable storage media;
   a predefined list of numbers stored on at least one of the one or more computer readable storage media, the predefined list of numbers comprising a plurality of prime numbers; and
   program instructions stored on at least one of the one or more computer readable storage media that, when executed by a processing system, direct the processing system to:
      receive requests for access to content, the content being stored in a distributed or cloud computing environment on associated server resources of a changing group of server resources, the changing of the changing group of server resources occurring through adding or removing one or more server resources to or from the changing group;
      map the requests to the associated server resources, wherein for each request, the program instructions direct the processing system to:
         obtain a numeric identifier (x) from the request;
         retrieve at least a first number (n) in the predefined list of numbers;
         calculate x mod n to generate a resource identifier, the resource identifier being the modulus result of x mod n;
         determine whether the resource identifier identifies an available associated server resource or an unavailable associated server resource; and
         in response to a determination that the resource identifier identifies the available associated server resource, communicate the request to the available associated server resource;
         in response to a determination that the resource identifier identifies the unavailable associated server resource, traverse the predefined list of numbers to retrieve a next number (m), calculate x mod m, and determine whether a resulting resource identifier identifies the available server associated resource or the unavailable associated server resource until the resource identifier identifies the available associated server resource.

17. The resource locator of claim 16, wherein the numeric identifier is obtained by performing a hash function of a request key of the request.

18. The resource locator of claim 16, further comprising instructions stored on at least one of the one or more computer readable storage media that, when executed by the processing system, direct the processing system to:
in response to receiving a request that comprises an actual identifier of the associated server resource, first use the actual identifier to communicate the request to the associated server resource; and if the associated server resource is not available, then obtain the numeric identifier and calculate the x mod n to generate the resource identifier.

19. The resource locator of claim 16, wherein the distributed or cloud computing environment is an email server environment, the server resources are email servers, and the content is email information.

20. The resource locator of claim 16, wherein the distributed or cloud computing environment is a distributed cache environment, the server resources are cache servers, and the content is cached data.

\* \* \* \* \*